US008682707B2

(12) United States Patent
    Pegden

(10) Patent No.: US 8,682,707 B2
(45) Date of Patent: Mar. 25, 2014

(54) SIMULATION-BASED RISK ANALYSIS FOR FINITE CAPACITY SCHEDULING

(75) Inventor: Claude Dennis Pegden, Sewickley, PA (US)

(73) Assignee: Simio LLC, Sewickley, PA (US)

( * ) Notice: Subject to any disclaimer, the term of this patent is extended or adjusted under 35 U.S.C. 154(b) by 0 days.

(21) Appl. No.: 13/993,725

(22) PCT Filed: Dec. 12, 2011

(86) PCT No.: PCT/US2011/064337
§ 371 (c)(1),
(2), (4) Date: Jul. 16, 2013

(87) PCT Pub. No.: WO2012/082584
PCT Pub. Date: Jun. 21, 2012

(65) Prior Publication Data
US 2013/0297370 A1    Nov. 7, 2013

Related U.S. Application Data

(60) Provisional application No. 61/422,709, filed on Dec. 14, 2010.

(51) Int. Cl.
    *G06F 17/00* (2006.01)
(52) U.S. Cl.
    USPC ........................................................ 705/7.26
(58) Field of Classification Search
    USPC ........................................................ 705/7.26
    See application file for complete search history.

(56) References Cited

U.S. PATENT DOCUMENTS

| | | | |
|---|---|---|---|
| 7,505,827 B1 | 3/2009 | Boddy et al. | |
| 8,306,842 B2* | 11/2012 | Rahi et al. | 705/7.23 |
| 2003/0225563 A1 | 12/2003 | Gonos | |
| 2005/0119907 A1* | 6/2005 | Dilger | 705/1 |
| 2005/0154625 A1 | 7/2005 | Chua et al. | |
| 2006/0053043 A1* | 3/2006 | Clarke | 705/8 |
| 2009/0164262 A1 | 6/2009 | Ettl et al. | |
| 2012/0084110 A1* | 4/2012 | Wu et al. | 705/7.13 |

OTHER PUBLICATIONS

International Search Report and Written Opinion for International Application No. PCT/US2011/064337 dated Jul. 31, 2012.

* cited by examiner

*Primary Examiner* — Thomas Dixon
(74) *Attorney, Agent, or Firm* — David G. Oberdick; Peter J. Borghetti (57) ABSTRACT

Scheduling software that provides both a deterministic schedule, such as shown in a Gantt chart or a work-to list (the role of traditional FCS software), along with additional information that can be used to judge the risk of the schedule when taking into account both the variations in task times, as well as the unplanned events. One embodiment of the present invention is a simulation model of a facility that incorporates the variations in task times and randomly generated events to provide stochastic estimates of risk measures. Another embodiment of the present invention may be the same model that is used to generate the deterministic schedule, however when generating the schedule the random variations and events are turned off, thereby generating a deterministic schedule. The same model can then be reused with the variations and random events turned on to generate risk measures for the associated deterministic schedule.

13 Claims, 6 Drawing Sheets

SIMULATION-BASED RISK ANALYSIS FOR FINITE CAPACITY SCHEDULING

CROSS REFERENCE TO RELATED APPLICATIONS

This application is a U.S. National Stage Application under 35 USC 371 filing of International Application Number PCT/US2011/064337, entitled "SIMULATION-BASED RISK ANALYSIS FOR FINITE CAPACITY SCHEDULING" filed on Dec. 12, 2011, which claims priority from U.S. Provisional Patent Application Ser. No. 61/422,709, entitled SIMULATION-BASED RISK ANALYSIS FOR FINITE CAPACITY SCHEDULING filed on Dec. 14, 2010, both are incorporated herein by reference.

FIELD OF THE INVENTION

This invention relates generally to finite capacity scheduling and more particularly relates to a simulation-based risk analysis in planning and scheduling to take into account the variations in elements and unexpected events for improved management decision making.

BACKGROUND OF THE INVENTION

Finite Capacity Schedules (FCS) is an activity for determining the best sequence of tasks on a set of resources. The result is an assignment of limited resources to tasks to generate a schedule for a set of jobs or activities to meet some specified objective, such as meeting milestones or maximizing throughput.

FCS applications include factory scheduling (discrete part, process flow, and batch operations), energy scheduling, servicing of complex equipment, scheduling of unique resources, military logistics, etc.

Figure 1:
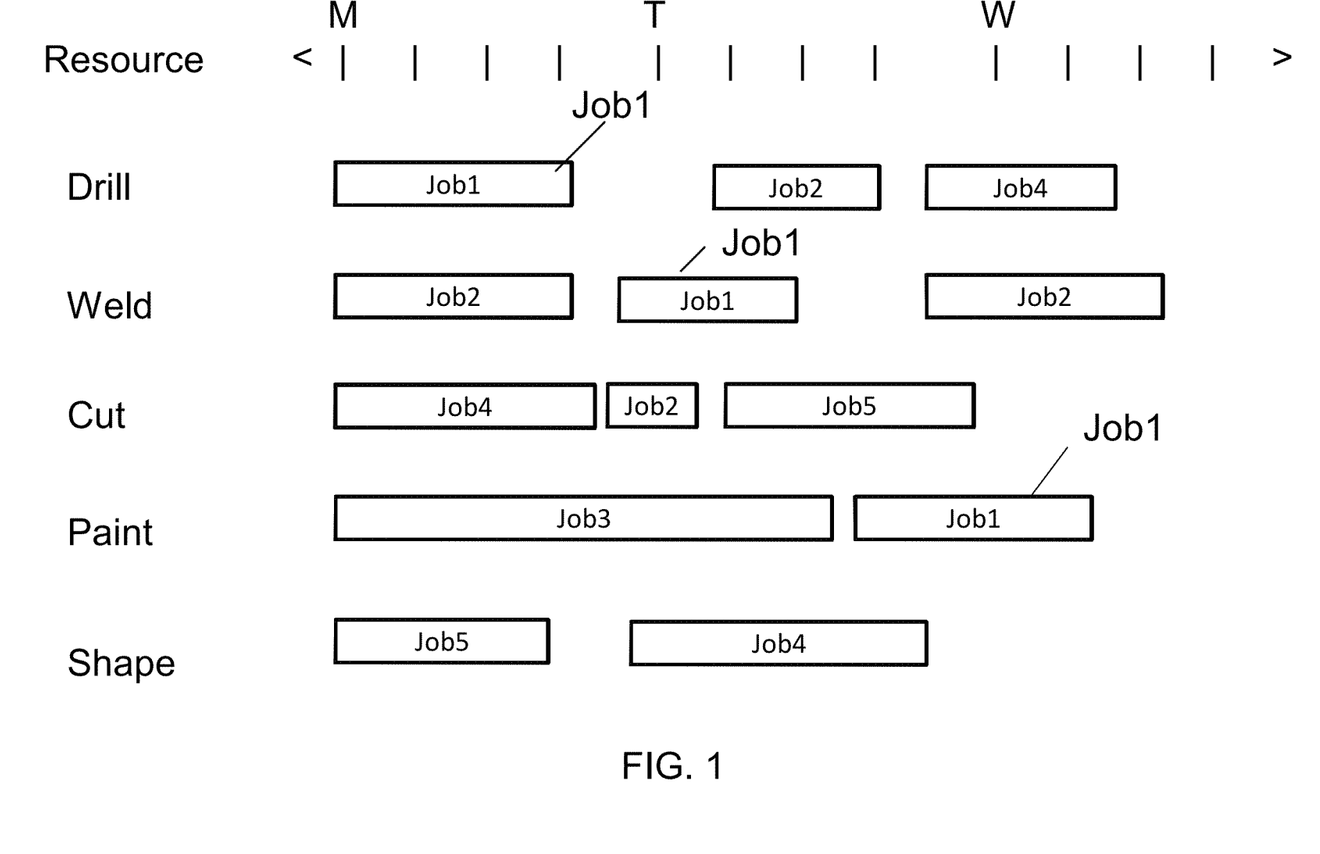
FIG. 1 is an example of a deterministic schedule displayed in resource Gantt form.
Figure 2:
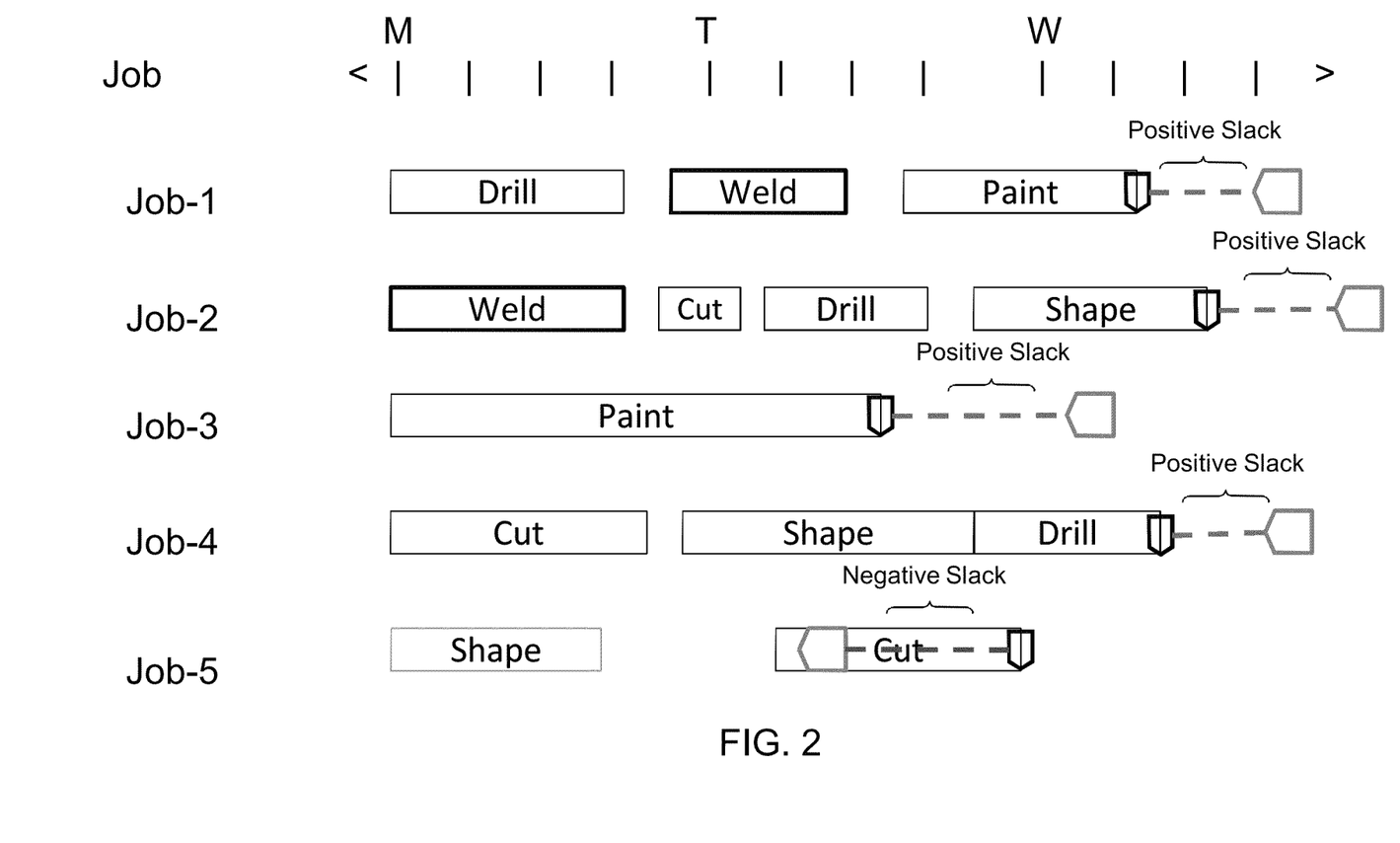
FIG. 2 is an example of a deterministic schedule displayed in job Gantt form.

The results of a scheduling activity are often displayed in the form of either a resource centric or job centric Gantt chart. A resource Gantt shows task as bars along a timeline for each critical resource in the model, where each bar denotes a job that is processed on that resource. A job Gantt shows task as bars along a timeline for each job in the model, where each bar denotes a resource that is used for performing a task on that job. FIG. 1 is an example of a schedule displayed in a resource Gantt chart form. Each color (or shaded contrast) bar denotes a specific job or activity, and each bar shows the spacing of tasks related to that job/activity over time for each of the resources. For example, Job1 can be depicted in red (not shown), and is processed first on the Drill, then on the Weld, and then on the Paint. The resources might be machines in a factory, procedure rooms in a hospital, workers performing assembly, etc. FIG. 2 is an example of a schedule displayed in a job Gantt chart form. Each color bar (or shaded contrast) denotes a specific resource that is used over time for each of the jobs. Here the resources are assigned a color (or different shade); e.g. the Drill can be green (not shown) and the Weld can be blue (not shown or a different shade than the Drill). The job Gantt chart also shows the job completion time and due date for each job in the form of a target symbol. The dashed line indicates either a positive slack (can be green—not shown) (such as for Job-1, Job-2, Job-3, and Job-4) or negative slack (can be red—not shown) (such as for Job-5) in terms of the completion date relative to due date. Jobs with a positive slack are scheduled on time, and those with a negative slack are late.

There are several methods used for assigning tasks to the resources. One method is to formulate the assignment of tasks as an optimization problem, and then use optimization heuristics to find a good (but not necessarily optimal) solution to the problem. Another method is to construct the schedule by applying heuristics (e.g. least remaining slack time) for directly constructing a sequence of tasks across each of the resources. An improved version of this method is to use a model of the facility, and construct the sequence of tasks by simulating the movement of jobs through the system, employing decision rules (e.g. the resource that can complete this task the fastest) within the model to make resource assignments.

All of these methods assume constant times for the tasks. In reality these times are often highly variable, and this variability will degrade the actual schedule. In addition there may be unplanned events (e.g. breakdowns, material shortages, power outages, etc.) that may also disrupt the schedule. Hence the projected task and job end times associated with the deterministic schedule that is generated are typically optimistic and the actual job completion times are typically end up being worse than indicated by the deterministic schedule. It is often difficult for the planner to assess how much the real schedule will differ from the planned schedule.

Since in typical applications a FCS degrades over time as task times vary and unplanned events occur, the normal practice is to regenerate a new (worse) schedule once unplanned events occur—or actual activity times differ significantly from their planned times. It's common that a job that is planned to be on time eventually ends up being late as a result. Existing FCS tools provide no basic for assessing the risk associated with a schedule in terms of the likelihood that specific tasks/jobs will be on time or that certain milestones or business objectives will be met.

Simulation has been used in the past as a basis for generating a FCS. However in the past the model used for generating the schedule has been a deterministic model.

SUMMARY OF THE INVENTION

The present invention is a simulation-based risk analysis to take into account the variations in elements (such as task times) and unplanned events for improved management decision making that includes the following aspects:

1. A scheduling tool that combines together within a single framework the dual use of a single stochastic simulation model to provide both a deterministic schedule and associated measures of risk.

2. The ability to automatically provide risk assessment for a generated deterministic schedule.

3. The ability to use a stochastic simulation model in deterministic mode as a finite capacity scheduler, and then use that same model with random variations and random unplanned events incorporated to generate statistical measures of risk for the deterministic schedule.

4. The ability to display measures of risk directly on the deterministic schedule in the form of a Gantt chart.

5. The ability to display measures of risk in tabular form for a deterministic schedule.

6. The ability to automate the process of switching between deterministic and random modes for a simulation model for the purpose of generating a deterministic schedule and associated risk estimators.

7. The ability to define a set of targets for each job that are automatically tracked by the simulation model, and for which risk measures may be calculated by replicating the stochastic model and recording values for the targets.

DETAILED DESCRIPTION OF THE PREFERRED EMBODIMENT

The present invention addresses the problem of providing the scheduler with both a deterministic plan such as shown in a Gantt chart (the role of traditional FCS software), along with additional information that can be used to judge the risk of the schedule when taking into account both the variations in the elements of the system (e.g. task times), as well as the unplanned events (e.g. machine breakdowns). The basic concept is to have a stochastic simulation model of the facility that incorporates the variations in elements and randomly generated events to provide stochastic estimates of risk measures. This model is also used to generate the schedule, however when generating the schedule the random variations in the elements and events are turned off, thereby generating a deterministic schedule. The same model can then be reused with the variations and random events turned on to generate risk measures for the associated deterministic schedule.

The elements that vary in the system can include: the task times for processing jobs on specific resources, yields from certain operations, arrival times for purchased subcomponents, outcomes for inspections, etc. These variable elements of the system are incorporated into the stochastic model using probability distributions. When executing the model in stochastic mode, a random sample is generated from these distributions. When executing the same model in deterministic mode these distributions return their expected value. For example, in deterministic mode the task time for a job on a specific machine would be the expected value of probability distribution that specifies its variable processing time. The unplanned events can include machine breakdowns, workers calling off sick, conveyor jams, etc. These unplanned events are not generated when running the model in deterministic mode. The time between unplanned events is specified in the stochastic model using a probability distribution. When running the model in stochastic mode, a random sample is generated from the distribution to determine the time between each occurrence of the event.

Figure 3:
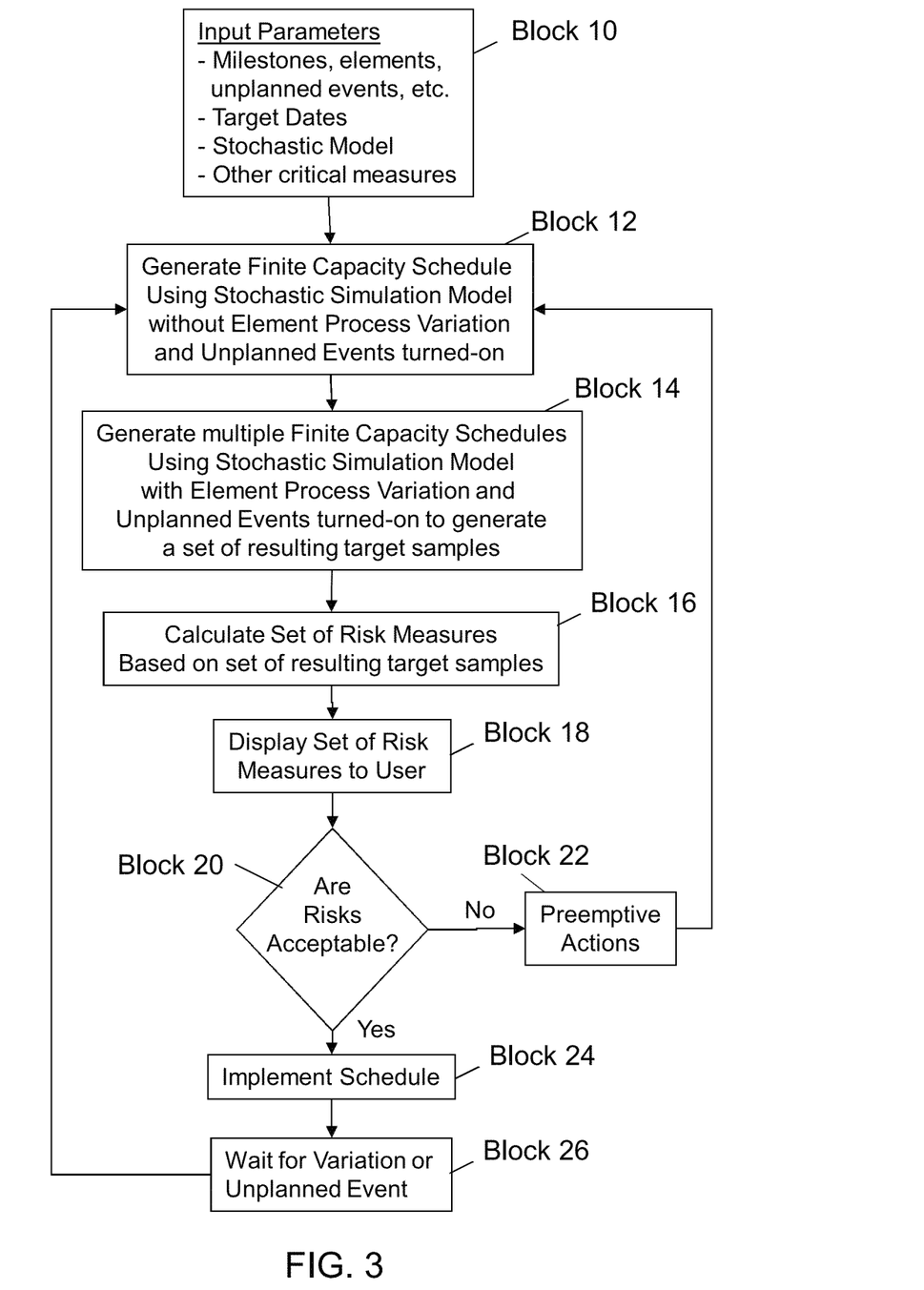
FIG. 3 is a decision flow chart of the process according to one embodiment of the present invention.

The steps involved in this process involve the following and are illustrated in FIG. 3:

1. The user defines the input parameters such as milestones, target dates, or other critical measures of performance for the schedule, along with a stochastic model of the system (Block 10). At this point the user may also specify certain controllable input parameters, such as the work schedules that resources will follow, or the shipping methods used for purchased materials. The targets might include certain date-time milestones such as "wings mounted to fuselage" or "final assembly complete" or "product shipped" as well as non date-time targets such as production cost or value added. Targets are considered met based on their schedule value (e.g. ship date) relative to a desired target value (e.g. due date).

2. A FCS is generated using a stochastic simulation model based on deterministic times and no unplanned events (Block 12). The removal of variation and unplanned events is done automatically by the simulation tool, with no action required by the user. This FCS generation is typically initiated by the user clicking a button in the software—e.g. a button labeled "Create Plan" could run the stochastic model in deterministic mode, automatically removing all variation and unplanned events from the model. FIG. 2 shows a deterministic plan generated by a simulation model using deterministic times. In this example, the first four jobs have a positive slack between their planned completion dates 40 (See FIG. 6) and the desired target values (due dates). Job-5 has a negative slack indicating this job will be late based on the deterministic plan. Note that in this example we have only one target per job (ship date); however each job could have multiple user-defined targets. For example, the user could define a target that specifies that the welding operation is completed by a specified date-time.

Figure 6:
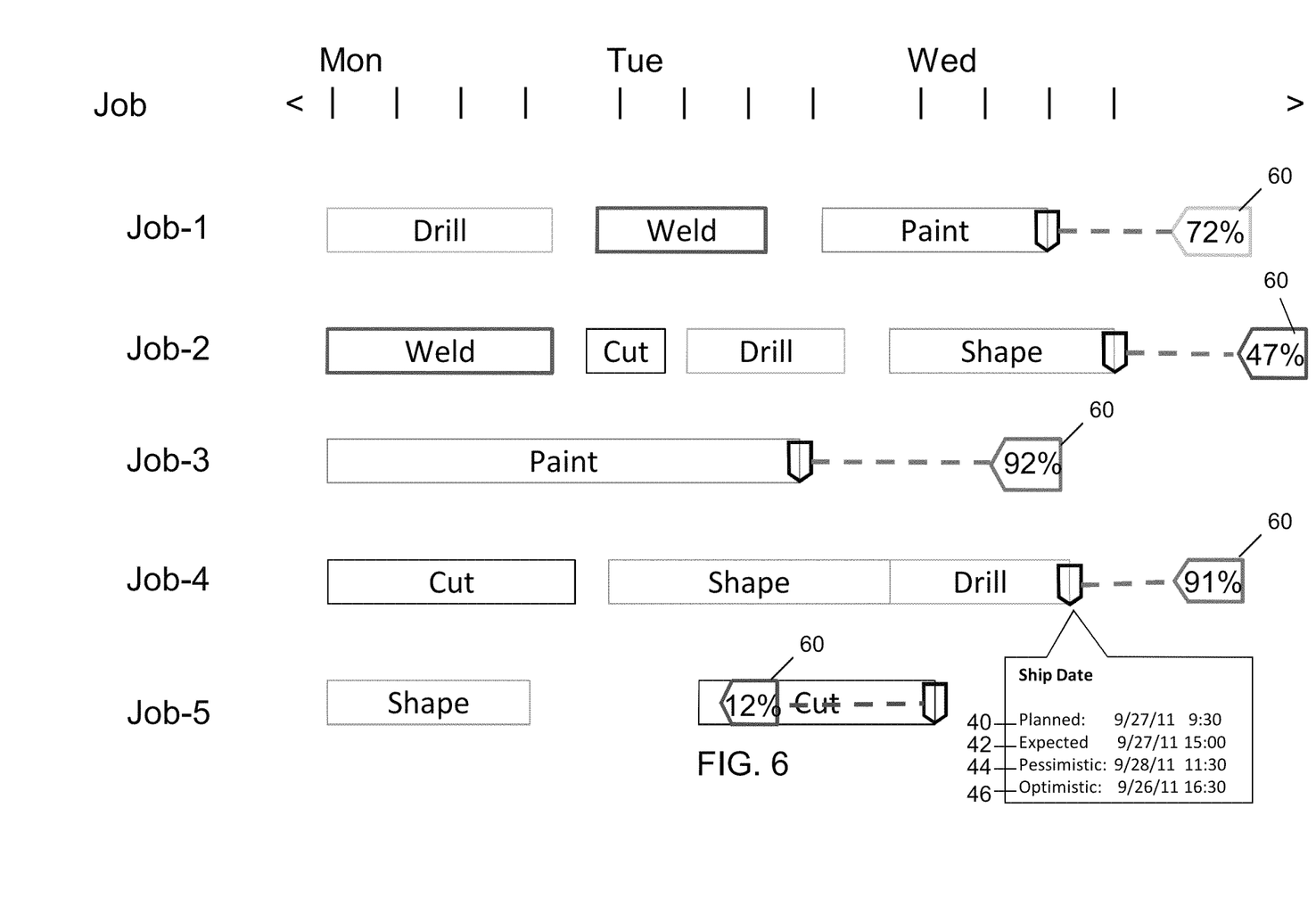
FIG. 6 is an example of a deterministic schedule displayed in job Gantt form with risk measures added according to the process illustrated in FIG. 3.

3. A risk analysis is initiated—either automatically or manually initiated by the user (Block 14). This is typically done by the user clicking a button in the software—e.g. a button labeled "Analyze Risk". It can also be done automatically each time a new plan is generated. Once initiated, the risk analysis is done automatically with no actions on the part of the user. The automated risk analysis is executed by running multiple replications of the stochastic model, with the variation and unplanned events automatically added back into the model, and the target results for each replication are automatically recorded across all user-defined targets and all jobs. This creates a set of result target samples for each user-defined target across all jobs. This set of result target samples can then be used to compute risk measures for the jobs using standard statistical estimators. The number of result target samples for each user-defined target is determined by the number of replications of the stochastic model and can be specified by the user as an input or be automatically calculated by the software (using standard methods) based on a desired maximum level of error for the risk measures. The user may also specify a confidence level used for generating confidence intervals on risk measures. Using the saved result target samples across all jobs and all replications, the system then automatically computes risk measures (Block 16), and displays these to the user (Block 18). For example, a target for shipping each job by a specified job due date could have computed risk measures that include the likelihood of shipping on time, the expected ship date 42 (FIG. 6), and a pessimistic ship date 44 (FIG. 6). Note that a pessimistic ship date is based on a user specified quantile—such as a 95% chance of shipping no later than the specified pessimistic date.

The risk measures are calculated (Block 16) using standard statistical estimators computed from the set of result target samples recorded and saved for each target and job across multiple replications of the stochastic model. For example, in the case of the risk measure for the likelihood of shipping on time, an estimate of this value is achieved by counting the number of target successes in N replications of the stochastic model. A simple estimator is the maximum likelihood estimator (MLE) for the Binomial distribution, which is X/N where X is the number of replications out of the total of N where the job met its specified target (e.g. shipped on time).

For example, if 100 replications of the stochastic model are run, a sample of 100 different ship dates are generated to evaluate. If 72 of 100 samples indicate that Job-1 is shipped on-time, then the MLE estimated probability of shipping Job-1 on-time as 72% (see FIG. 6). There are several other more sophisticated methods that can be used for computing this estimate from the samples—such as the Wilson score interval. These calculations are done for all targets across all jobs.

The risk measures are computed by replicating the simulation model of the facility multiple times to generate the samples for each user-defined target and compute the appropriate statistical estimates. The samples are generated using the stochastic model based on the underlying variation in the system (see Block 14 of FIG. 3). This process of running replications of the simulation to assess the risk can be made completely automatic (i.e. each time a schedule is generated, the risk assessment is generated), or be manually triggered (e.g. by the user clicking on a button to "Analysis Risk." In either case, once initiated the process of adding in variation and unplanned events, executing the necessary replications and recording all result target samples across all jobs for each replication, and computing the associated risk measures are completely automatic.

Figure 4:
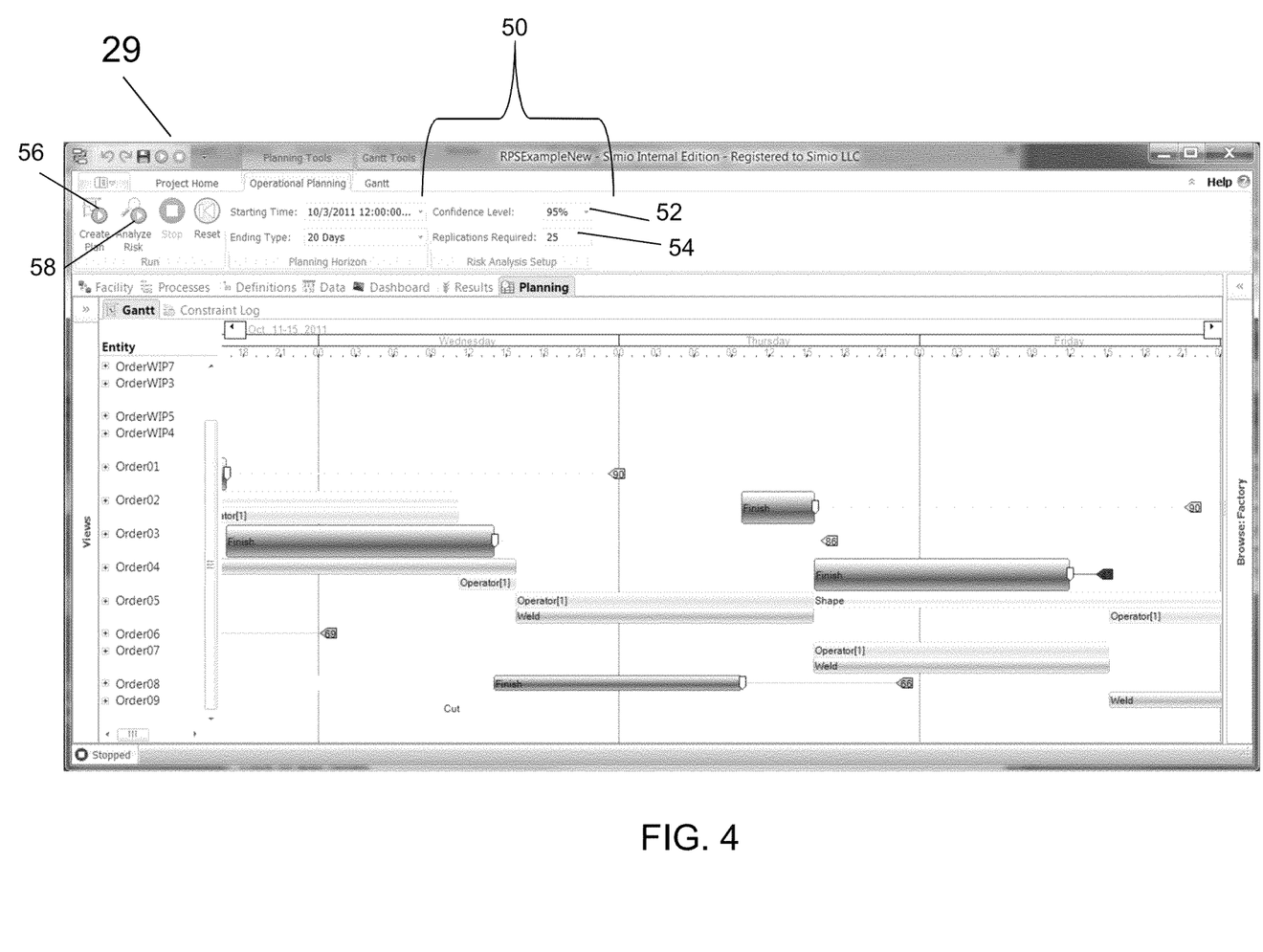
FIG. 4 is an example of a deterministic schedule in job Gantt form that is generated using a stochastic model of the facility by first assuming constant and known processing times, along with the assumption of no unplanned events, and then with risk measures displayed based on automatically adding variation to the model, and then replicating the model to obtain risk measures according to the process illustrated in FIG. 3.
Figure 5:
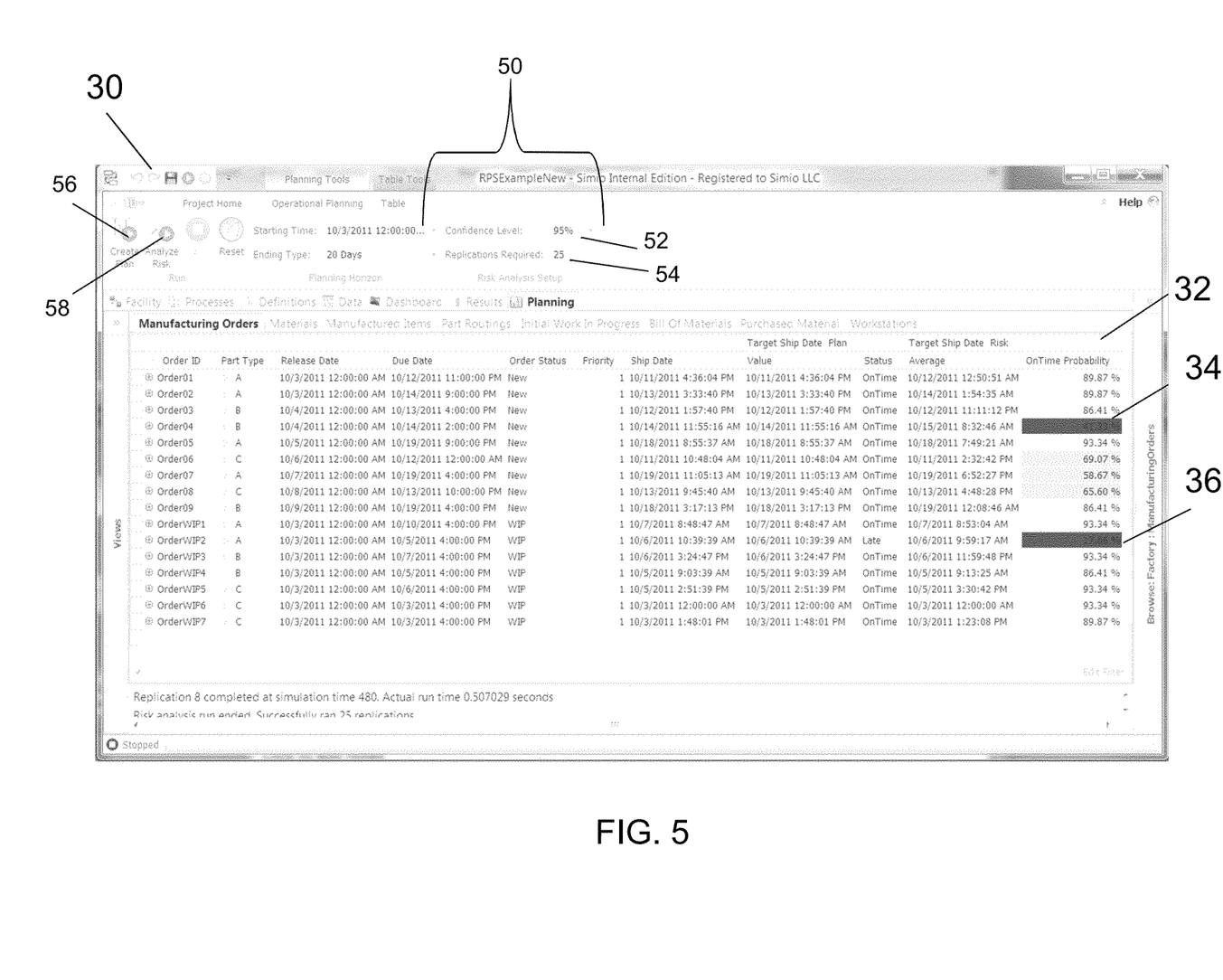
FIG. 5 is an example of risk measures displayed in the job table for a schedule according to the process illustrated in FIG. 3.

4. The risk measures are displayed to the user, either on the Gantt chart 29 (FIG. 4), in tabular form 30 (FIG. 5), or using other text or graphical presentation methods (Block 18). FIG. 6 shows probability risk measures that are displayed in terms of color-coded probabilities directly on the job Gantt chart 30. In this example, Job-1 has a 72% chance of shipping on time, and Job-2 has a 47% chance of shipping on time. Additional risk measures (e.g. expected ship 42 (FIG. 6) or pessimistic ship date 44 (FIG. 6)) can be shown in tool tips (see the sample pop-up tool tip 48 (FIG. 6) or by other display methods. FIG. 5 shows this same risk information in tabular form. FIG. 5 also illustrates one example of a user interface 50 to allow the scheduler to specify the number of replications 52 and confidence level 54 to be used in the risk analysis, and buttons 56, 58 for creating the deterministic plan and then analyzing the associated risks, respectively.

5. The user then takes preemptive actions (Block 22) (e.g. adding overtime, changing job priorities, etc.) and goes back to step 2 (Block 12). The preemptive actions could be based on trial and error, experience, or an expert system that automatically makes suggestions for improving the schedule. The preemptive actions could be entered in tables, dialog boxes, or other user-interface controls that are provided to the scheduler. The preemptive actions might include changing work schedules for resources (e.g. overtime), expediting shipping for inbound materials, etc. Note that the same user-interface controls that are used for preemptive actions might also be used in Block 10 to establish the initial conditions for the starting schedule. Steps 2 to 5 are repeated until a schedule with acceptable quality and risk measures are achieved (Block 20). This schedule is then implemented in the production system (Block 24)

Once the deterministic schedule is implemented, the scheduler then waits for process variation or an unplanned event in the production system to cause the deterministic schedule to become invalid (Block 26). Note that automated alarms could be used to notify the human scheduler that a significant change has occurred. The variation/unplanned event (e.g. a machine breakdown that will require 4 hours to repair) is then entered into the model either manually (using tables, dialog boxes, or other provided user interface controls) or automatically through a real time interface. The scheduler then returns to step 2 (Block 12).

Note that this process combines the stochastic predictive power of simulation modeling (which can fully represent variation in the system) with deterministic FCS methods, to both generate deterministic schedules as a working plan, but also provide the user with the associated measures of risk for that particular schedule. The simulation based-risk and quality measures based on the underlying variability in the system becomes the critical component in both anticipating and addressing issues that exposed by the simulation-based risk measures.

Now turning to FIG. 5, the risk measures could be displayed to the decision-measure in many different ways. The simplest way is to display the risk measure (e.g. likelihood of being on time) in a table 30 (FIG. 5) or a pop up tool tip 48 on the Gantt chart (FIG. 4). For example, the list of jobs might have an extra column 32 that specifies the probability that the job is on-time. In addition, jobs that are high risk of being late 34 (41.33% on-time), 36 (17.06% on-time) could be graphically indicated (by color, highlighting, etc.) directly on the Gantt chart. Shading, opacity, and hatch styles could be used to distinguish between jobs in different categories or risk—e.g. jobs with a low likelihood of shipping on-time might be shown in either low or high opacity. Likewise the jobs that are listed in tabular form and jobs that are high risk could be highlighted by several means such as coloring or shading. Finally a filtering/sorting mechanism can be employed to list all jobs that reach a critical level of risk—e.g. have a greater than 10% chance of being late.

FIG. 6 shows the job Gantt chart of FIG. 2 with risk measures 60 added according to the present invention. The numbers added to the targets are the probability that the specific job will be completed prior to its due date. Targets can be color-coded by risk level based on this probability—e.g. the highest risk jobs can be coded red (such as Job-2 (47% on time)), the moderate jobs can be coded yellow (such as Job-1 (72% on time)), and the low risk jobs can be colored green (such as Job-3 (92%) and Job-4 (91% on time)). The color labeling is used herein for illustration purposes and is not to limit the invention.

The method described herein fills in critical information to the decision-maker to assess the robustness and risk of a given schedule. With the existing technology, the decision-maker only has available the deterministic schedule—which by nature is overly optimistic. The decision-maker has no basis for judging the true quality of the schedule or the likelihood of specific jobs being late. In contrast, the present invention provides the decision maker critical quality and risk measures such as the expected number of tardy jobs, their average lateness, as well as the likelihood that a specific job will ship on time. This is crucial information that allows the decision-maker to take corrective actions such as working an extra-shift, expediting material deliveries, delaying planned but optional preventative maintenance, or changing job priorities to make sure that critical jobs have a high likelihood of shipping on schedule. In short, the present invention is targeted at providing the decision-maker with the information needed to make informed decisions that improve the on-time delivery of products or services to their customers.

There are a number of different risk measures that can be computed from the recorded random target samples across all jobs for each of the user-defined targets. Some common measures include the following:

1. The probability that a given task/job or milestone is completed by a specified target date 40 (FIG. 6).

2. The expected (i.e. a statistical estimate of the mean) task/job or milestone completion date 42 (FIG. 6) (typically worse than the projected completion date in the deterministic schedule).

3. An optimistic task/job/milestone completion date based on a quantile—e.g. only 20% of the time this task/job/milestone will complete by a specified optimistic date 46 (FIG. 6).

4. A pessimistic task or job completion date based on a quantile—e.g. 80% of the time this task/job/milestone will complete by a specified pessimistic date 44 (FIG. 6).

5. The percent of task/jobs/milestones that are expected to be tardy.

6. The average tardiness.

7. The percent of task/jobs/milestones that are expected to be tardier than a specified amount of time.

Most of the risk measures are performance against a target time (commonly a due date for shipping the job) for a specific milestone. There is typically a milestone corresponding to a job completing, and there can also be milestones for intermediate points (e.g. the wing on an airplane has been attached to the frame). The risk measures are then typically tied to the missing of milestones. For example, with a ship date target the risk measure may be the likelihood of shipping on-time (or shipping late). However, targets do not always need to be based on dates/times, but can take any form. For example with a cost target the risk measure might be the likelihood of total cost falling below or above a target value. Likewise an earned-value target could specify that the earned value for a specified airplane assembly job exceed a minimum value by the time wing assembly is completed.

The purpose of these risk measures is to give the decision maker information about the quality of the generated schedule in terms of meeting milestones and overall business objectives. Note that these risk measures (unlike the deterministic finite capacity schedule) take into account both task variations and random unplanned events. For example, the deterministic schedule would ignore processing time variations, machine breakdowns, worker call-offs, and supplier delays, whereas the risk analysis would include these random events and variations in the calculations.

While the disclosure has been described in detail and with reference to specific embodiments thereof, it will be apparent to one skilled in the art that various changes and modifications can be made therein without departing from the spirit and scope of the embodiments.

What is claimed is:

1. A scheduling system comprising:
a computer which executes a stochastic model;
the stochastic model having one or more jobs associated with one or more resources and input parameters, wherein each job of the one or more jobs has one or more user-defined targets, wherein each associated job and resource includes (i) elements with variability defined by probability distributions and (ii) unplanned events;
a first subroutine operably connected to the stochastic model, wherein the first subroutine executes the stochastic model in a deterministic mode to generate a finite-capacity schedule based on the one or more jobs;
a second subroutine operably connected to the stochastic model, wherein the second subroutine executes the stochastic model a number of times specified by a user or calculated by an automatic subroutine executed by the second subroutine to generate multiple finite-capacity schedules, wherein each execution of the stochastic model incorporates (i) variations in the elements based on a sampling from the element probability distributions and/or (ii) the unplanned events to generate and record a set of resulting target samples for each of the one or more user-defined targets for the one or more jobs;
a third subroutine to compute one or more risk measures from the recorded set of resulting target samples for the one or more user-defined targets; and
a fourth subroutine to display the one or more risk measures across the one or more jobs,
whereby the user determines whether the one or more risk measures of the finite-capacity schedule is acceptable.

2. The scheduling system according to claim 1, wherein the finite-capacity schedule and the one or more risk measures are displayed in a Gantt chart, a table, or a work-to list.

3. The scheduling system according to claim 1, further comprising a preemptive action mechanism operably connected to the first subroutine (i) to modify the input parameters of the stochastic model with one or more exceptions, (ii) to execute the first subroutine to generate a modified finite-capacity schedule with the modified input parameters, and (iii) to recalculate the risk measures when the one or more risk measures of the initial finite-capacity schedule is unacceptable.

4. The scheduling system according to claim 3, wherein one exception of the one or more exceptions is overtime for a resource of the one or more resources associated with a job of the one or more jobs.

5. The scheduling system model according to claim 1, further comprising a schedule modification mechanism operably connected to the first subroutine (i) to modify the input parameters of the stochastic model with one or more exceptions, (ii) to execute the first subroutine to generate a modified finite-capacity schedule with the modified input parameters, and (iii) to recalculate the risk measures when an actual unplanned event occurs.

6. The scheduling system according to claim 5, wherein one exception of the one or more exceptions is maintenance down time for repairing a resource of the one or more.

7. A scheduling method comprising step of:
a. providing a computer which executes a stochastic model;
b. creating the stochastic model having one or more jobs associated with one or more resources and input parameters, wherein each job of the one or more jobs has one or more user-defined targets, wherein each associated job and resource includes (i) elements with variability defined by probability distributions and (ii) unplanned events;
c. generating a finite-capacity schedule based on the one or more jobs by executing the stochastic model in a deterministic mode;
d. generating a sampling of target results by making a plurality of executions of the stochastic model to generate a plurality of finite-capacity schedules, wherein each execution of the stochastic model incorporates (i) variations in the elements based on a sampling from the element probability distributions and/or (ii) the unplanned events to generate and record a set of resulting target samples for each of the one or more user-defined targets for the one or more jobs;
e. computing one or more risk measures for the one or more jobs and one or more user defined targets based on the recorded set of resulting target samples for the one or more user-defined targets; and
f. displaying the one or more risk measures,
whereby the user determines whether the one or more risk measures of the finite-capacity schedule is acceptable.

8. The scheduling method according to claim 7, wherein the finite-capacity schedule and the one or more risk measures is displayed in a Gantt chart, a table, or a work-to list.

9. The scheduling method according to claim 7, wherein the one or more user-defined targets can include a date-time, cost, yield, quality level, or earned value.

10. The scheduling method according to claim 7, further comprising steps of:
   modifying the input parameters of the stochastic model with one or more exceptions;
   repeating step c to calculate a new finite-capacity schedule with the modified input parameters; and
   repeating steps d-f to generate and to display new risk measures for the one or more jobs when the one or more risk measures of the finite-capacity schedule is unacceptable.

11. The scheduling method according to claim 10, wherein the step of modifying the input parameters of the stochastic model with one or more exceptions comprises a step of adding overtime for a resource of the one or more resources associated with a job of the one or more jobs.

12. The scheduling method according to claim 7, further comprising steps of:
   modifying the input parameters of the stochastic model with one or more exceptions;
   repeating step c to calculate a new finite-capacity schedule with the modified input parameters; and
   repeating steps d-f to generate and to display new risk measures for the one or more jobs when an actual unplanned event occurs.

13. The scheduling method according to claim 12, wherein the step of modifying the input parameters of the stochastic model with one or more exceptions comprises a step of adding maintenance down time for repairing a resource of the one or more resources associated with a job of the one or more jobs.

* * * * *